Figure 4:
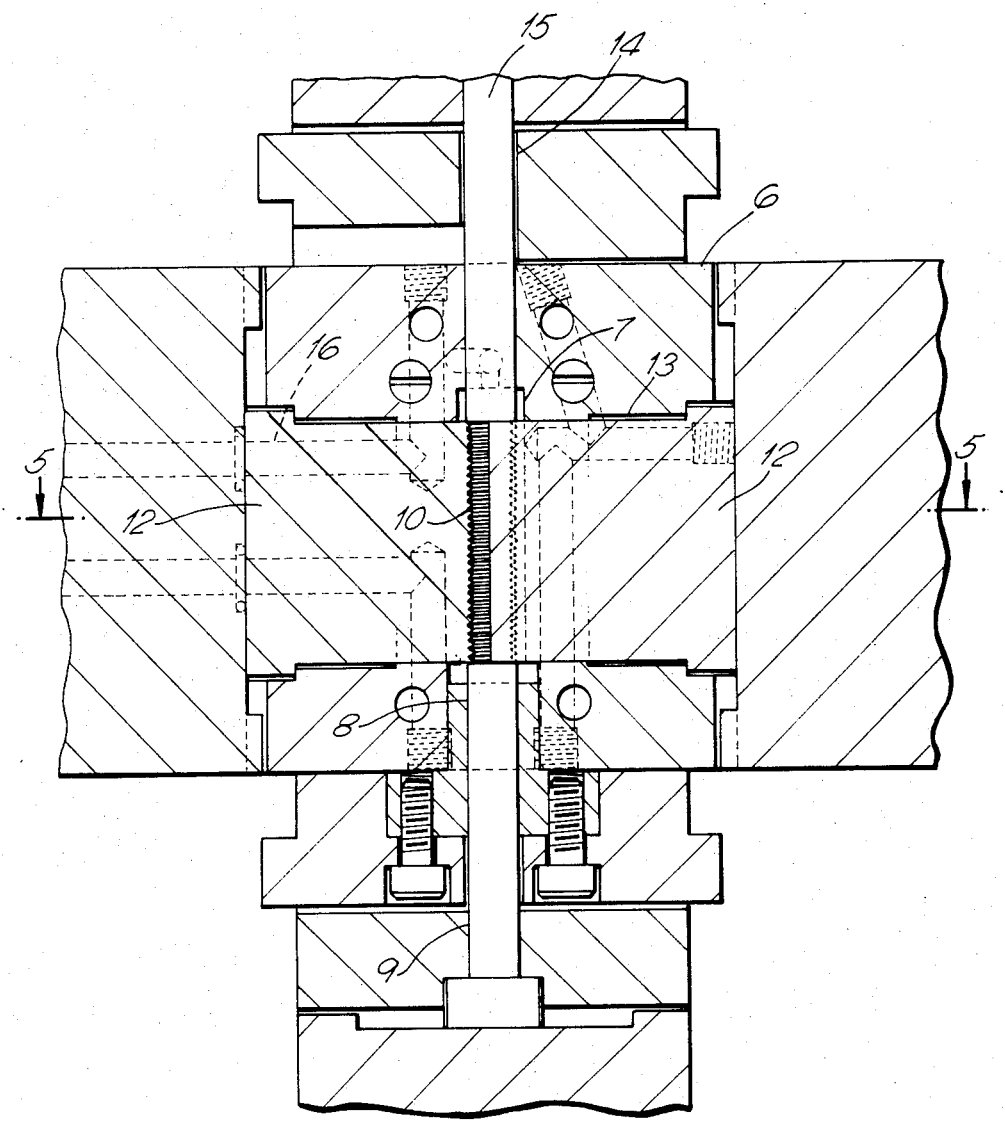

United States Patent [19]

Ferguson

[11] Patent Number: 4,633,932

[45] Date of Patent: Jan. 6, 1987

[54] METHOD AND APPARATUS FOR FORMING AN INTERNALLY SCREW-THREADED ARTICLE

[75] Inventor: James M. Ferguson, Glasgow, Scotland

[73] Assignee: Dynacast International Limited, England

[21] Appl. No.: 639,394

[22] Filed: Aug. 10, 1984

[30] Foreign Application Priority Data

Aug. 20, 1983 [GB] United Kingdom ............... 8322469

[51] Int. Cl.⁴ ..................... B22D 29/00; B22D 17/24
[52] U.S. Cl. ................................. 164/131; 164/132; 164/137; 164/340; 164/346; 249/59
[58] Field of Search ............................ 164/339–343, 164/132, 137, 345, 346; 249/59

[56] References Cited

U.S. PATENT DOCUMENTS 3,057,014 10/1962 Kirch ..................................... 249/59
4,090,687 5/1978 Langhammer et al. ............. 164/346
4,188,178 2/1980 Anscher .................................. 249/59

Primary Examiner—Nicholas P. Godici
Assistant Examiner—Samuel M. Heinrich
Attorney, Agent, or Firm—Larson & Taylor

[57] ABSTRACT

A method of casting or moulding an article having an internally screw-threaded hole comprises introducing casting or moulding material into a mould cavity around a core pin formed with segments of a screw thread separated by flutes and also around withdrawable flat core members projecting into the mould cavity with their leading ends fitting snugly into the flutes. The segments of screw thread form the male image of segments of the required female thread. When the casting or moulding material has set first the core members are withdrawn from the mould cavity then the core pin is rotated to bring the screw-threaded segments into the positions formerly occupied by the flutes and the pin is withdrawn axially from the mould cavity. Finally the article is removed from the mould cavity.

8 Claims, 5 Drawing Figures

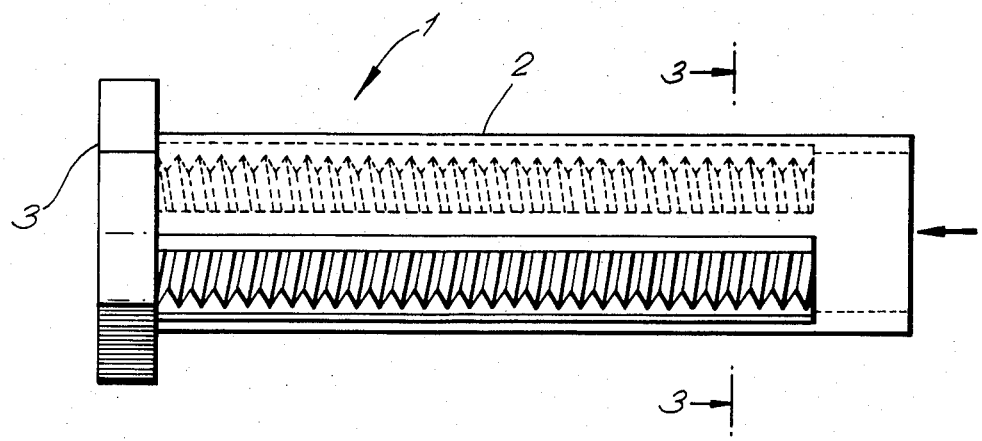
Fig. 1.
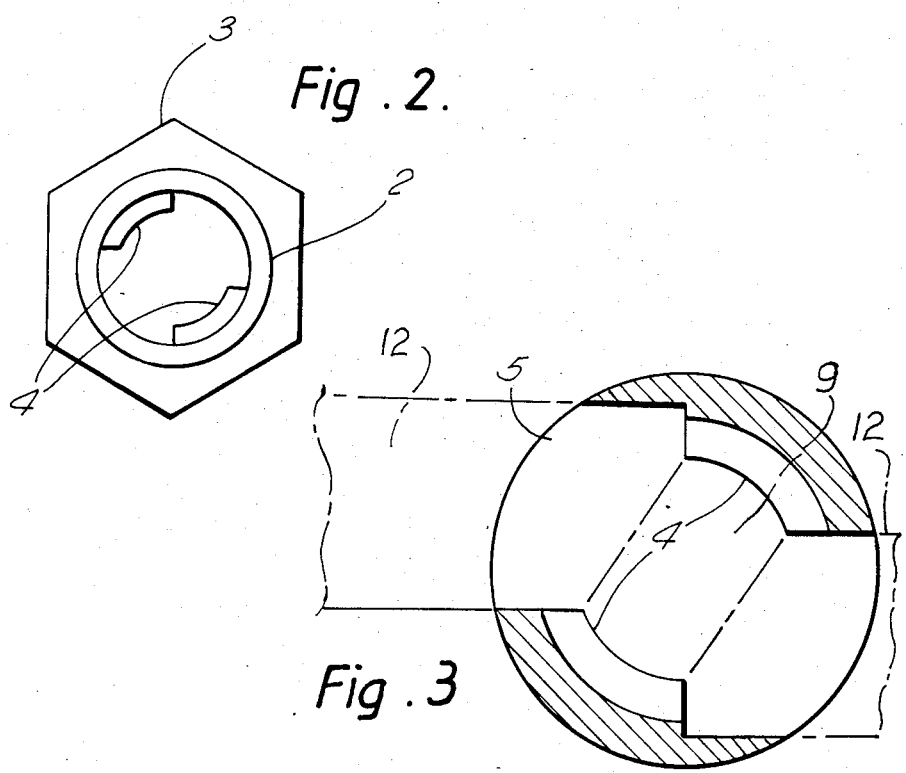
Fig. 2.
Fig. 3

METHOD AND APPARATUS FOR FORMING AN INTERNALLY SCREW-THREADED ARTICLE

The subject of this invention is a method of forming by casting or moulding an internally screw-threaded article.

In the usual method of forming an internally screw-threaded article by casting or moulding it is necessary to employ a core formed with a mirror image of the screw thread. To remove the core it is normally necessary to unscrew the core all the way out of the formed article. This process is time consuming and adds considerable complication to the die casting machinery. Certainly in forming some articles of plastics material employing a coarse thread of short length it is possible to pull the core out, simply causing the material of the moulding to spring outwardly over the screw thread on the core. This is quite impossible with an article cast or moulded in a rigid material, for example in metal.

In consequence great savings in time could be effected by casting or moulding the article in such a way that the core forming the internal screw thread did not require to be unscrewed from the formed article and it is an object of the present invention to provide a method of and apparatus for forming such an article. It is also an object of the invention to provide an internally screw-threaded tubular article having improved characteristics over such articles as already known.

An example of the kind of article to which the invention is particularly applicable is a metallic socket to be used for attaching a trophy to a wooden base, the socket being inserted into a hole formed on the underside of the wooden base and a screw-threaded pin fitted through the trophy down into the screw-threaded interior of the socket. This is, of course, only one example of the use of such an article but the method and apparatus are, of course applicable to many different forms of internally screw-threaded article.

According to the invention a method of casting or moulding an article having an internally screw-threaded hole in a mould cavity shaped to define the exterior contour of the article is characterized by introducing casting or moulding material into the mould cavity around a core pin formed with two diametrally opposite segments of a male image of the female internal screw thread to be formed in the article, said segments being separated by diametrically opposite flutes which are deeper than the depth of the screw threads on the segments, the angle subtended at the axis of the pin by the segments being less than the angle subtended by the flutes at said axis and also around two withdrawable flat core members, the leading end of each of which fits snugly into a respective flute in the core pin, allowing the casting or moulding material to set in the mould, withdrawing the core members from the mould cavity, rotating the core pin through an angle sufficient to cause the screw-threaded segments to occupy a position within the angular position formerly occupied by the flutes of the core pin, withdrawing axially the core pin from the mould and removing the article from the mould cavity.

Apparatus for forming by casting or moulding an article having an internally screw-threaded hole including a mould body formed with a cavity shaped to define the exterior contour of the article to be formed and provided with at least one passage for introduction into the cavity of casting or moulding material is characterized in that the mould body is formed with two slots extending outwardly from the cavity to the outside of the mould body and with a bore coaxial with the screw-threaded hole to be formed in the article and opening into the cavity, a core pin slidable through the bore into the cavity, said core pin being formed with two diametrically opposite segments formed as male images of segments of the female screw thread to be formed in the cavity, said segments on the core pin being separated by flutes deeper than the depth of the screw-threads on the segments, the angle subtended by the segments on the core pin at the axis of the pin being less than the angle subtended by the flutes at said axis and two flat core members slidable within the slots into the mould cavity, the leading end of each core member being formed to fit snugly into a respective flute in the core pin, means for moving the flat core members into and out of the mould cavity and means for inserting, withdrawing and rotating the core pin through a predetermined angle.

The slots for accommodating the core members may be offset transversely from one another with respect to the axis of the core pin so that their median planes are parallel and on opposite sides of the axis of the core pin.

The mould cavity may be formed with a second bore opening into the cavity, said bore being coaxial with the first-mentioned bore, a second core pin being slidable through said second bore.

The two core pins may be arranged to meet one another in the cavity.

The second core pin may also be formed with segments of a screw thread diametrically opposite one another and the screw thread on the second core pin may be different from the screw thread on the segments of the first core pin, for example, it may be of different or opposite pitch. In a construction employing two core pins, each formed with screw-threaded segments, the two pins are arranged to be insertable in such a position that the flutes of the two pins line up with one another so that each flat core member engages the respective aligned flutes on both pins.

Figure 5:
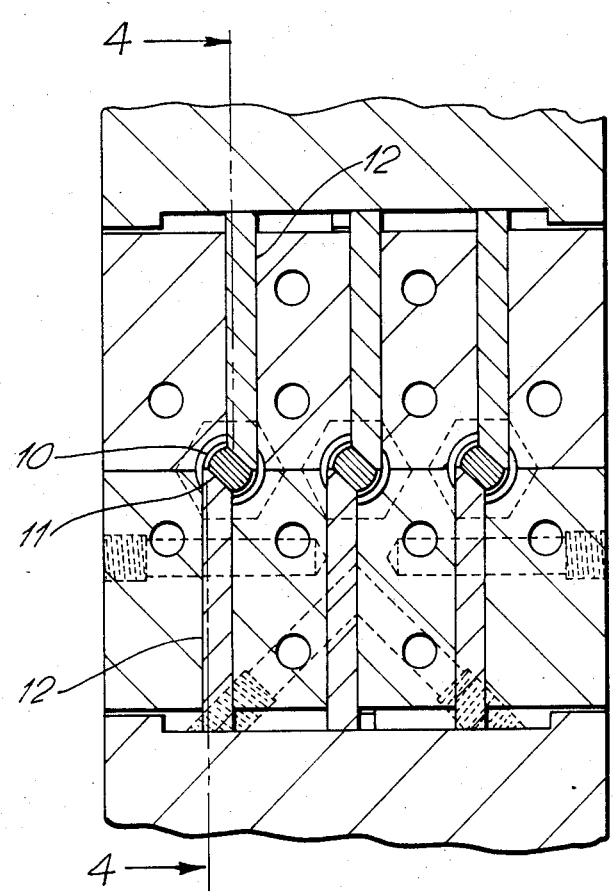

A practical embodiment of the invention is illustrated in the accompanying drawings in which FIG. 1 is a side view of an internally screw-threaded tubular article formed by the process and apparatus of the invention, FIG. 2 is a view looking in the direction of the arrow in FIG. 1, FIG. 3 is a section to an enlarged scale through the line 3—3 in FIG. 1 out with portions of the apparatus shown thereon in dotted lines, FIG. 4 is a section through the apparatus taken along line 4—4 of FIG. 5 showing two core pins and the flat core members in one cavity and FIG. 5 is a section through the line 5—5 in FIG. 4. In the construction illustrated the flat core members are offset transversely from one another with respect to the axes of the core pins. The illustrated construction also incorporates multiple mould cavities with the associated core pins and core members.

In the drawings and referring particularly to FIGS. 1, 2 and 3, 1 denotes an internally screw-threaded metallic socket suitable for use in attaching an object such as a trophy to a wooden base. The article 1 has a cylindrical portion 2 and a hexagonal head 3 formed on one end thereof. 4 denotes diametrically opposite segments of a screw thread which co-operate to form part of a screw-threaded bore in the article able to receive a screw-threaded pin or fixing screw inserted from one end. The body 2 has two longitudinal slots 5 which have been formed as will be described later in the specification.

Referring now to FIGS. 4 and 5, 6 denotes a mould formed with a cavity 7 shaped to form the exterior contour of the article to be formed therein. 8 denotes a bore formed in one end of the mould body, 9 denotes a core pin inserted through the bore 8, the end of the core pin 9 protecting into the mould cavity 7 being formed with two diametrically opposite segments 10 formed as mirror images of the screw thread to be formed in the cavity, the segments 10 being separated by flutes 11 deeper than the depth of the screw threads. The angle subtended by the segments 10 at the axis of the pin 9 is less than the angle subtended by the flutes 11. 12 denotes core members slidable within slots 13 formed in the mould body 6 and extending from the cavity 7 to the outside of the mould body. The leading end of each core member is formed to fit snugly into a respective flute 11 in the core pin 9 as can be seen clearly in FIG. 5 and as also represented by dotted lines in FIG. 3. While it is not necessary that the core members 12 should be offset from one another there is some advantage in offsetting them as is illustrated in FIG. 5 as this makes it possible to provide that the flutes in the core pin subtend a greater angle at the axis of the pin than the segments with core members of reduced thickness. 14 denotes a second bore in the opposite end of the mould body 6 and 15 denotes a second core pin inserted through the second bore 14 and abutting against the end of the core pin 9. In the illustrated construction the core pin 15 is a plain pin of a diameter greater than the diameter of the screw thread to be formed in the moulded article i.e. the screw thread formed by the segments 10 but it will be understood that the mould cavity may terminate at the end of the core pin 9, it being then unnecessary to provide a second bore 14 and a second core pin 15, the article formed then having a screw threaded hole extending completely to one end with the slots 5 being open ended slots at that end. In another alternative the second core pin 15 may be also formed with screw-threaded segments and flutes, the flutes matching the flutes in the core pin 9, said second core pin 15 then extending into the core cavity to meet the end of the core pin 9, and the core members 12 then engaging the flutes in both pins. This construction is particularly useful where it is desired to form a screw-threaded hole containing screw-threaded portions having different characteristics, for example, different diameters and/or different pitches and/or opposite pitches. 16 denotes passages for introduction of casting material into the mould cavity. Since the apparatus for advancing, withdrawing and rotating the core pins and for advancing and withdrawing the core members are of conventional type it has been deemed unnecessary to illustrate such apparatus.

In practice, an article is formed in the apparatus by inserting the core pin 9 axially into the cavity 7 in the mould body in such an angular position that the flutes 11 are opposite the slots 13 in the mould body 6, moving the flat core members 12 into the mould body 6 through the slots 13 until the leading ends of the core members 12 engage and fit snugly into the flutes 11 in the core pin 9 and introducing casting or moulding material into the cavity 7. Then, when the material has solidified, first withdrawing the flat core members 12 completely out of the mould cavity 7, then rotating the core pin 9 so that the screw-threaded segments 10 move out of the screw-threaded segments formed in the article into the gap left by the withdrawn flat core members and withdrawing the core pin 9 axially without further rotational movement and removing the article from the mould cavity 7. The article formed is as illustrated in FIGS. 1, 2 and 3. The two segments 4 of a screw threaded are quite sufficient for engagement with a screw-threaded pin or other screw-threaded fixing device.

The method and apparatus of the invention can be used to produce articles of many shapes, the feature produced by the invention being the screw-threaded hole. The body of the article need not be cylindrical, for example, it may be hexagonal or other polygonal shape. The method and apparatus can be used to form, for example, the centre member of a turnbuckle utilizing two core pins as previously described each pin having segments formed as mirror image screw threads, the segments of one pin being of right hand pitch and the segments of the other pin being of left hand pitch. The diametrically opposite slots formed by the core members in the body present the opening normally provided in the body of a turnbuckle for the insertion of a tommy bar.

An article formed by the process of the invention has the advantage of providing grip for a screw-threaded pin while saving the material which would otherwise fill the slots. The article is lighter for this reason also. The presence of the slots also makes it easy to observe how far a screw-threaded object is screwed into the article.

What I claim is:

1. The method of casting or moulding an article having an accurately formed internally screw-threaded hole in a mould body formed with a cavity shaped to define the exterior contour of the article by introducing casting or moulding material into the mould cavity around a core pin formed with two diametrically opposite segments of a male image of the female internal screw thread to be formed in the article, said segments of the core pin being separated by diametrically opposite flutes which are deeper than the depth of the screw-threads on the segments, the angle subtended at the axis of the pin by the segments being less than the angle subtended by the flutes at said axis, in which ther are included the steps of moving two withdrawable flat core members through slots formed in the sides of the mould body into the mould cavity in a direction transversely of the core pin such that the core members are guided accurately toward the core pin with their leading ends entering and fitting snugly into respective flutes in the core pin and engaging the core pin such that the core pin is located between them accurately in the mould cavity before the casting or moulding material is introduced into the mould cavity and, after the casting and moulding material has been introduced into the cavity and has set therein, withdrawing the core members through the slots in the mould body from engagement with the core pin, the method being thereupon completed by rotating the core pin through an angle sufficient to cause the screw-threaded segments to occupy a position within the angular position formerly occupied by the flutes of the core pin, withdrawing axially the core pin from the mould and removing the article from the mould cavity.

2. Apparatus for forming by casting or moulding an article having an internally screw-threaded hole, including a mould body formed with a cavity shaped to define the exterior contour of the article to be formed and provided with at least one passage for introduction into the cavity of casting or moulding material, in which the mould body is formed with a bore coaxial with the screw-threaded hole to be formed in the article and open to the cavity, and with two slots extending outwardly from the cavity to the outside of the mould body in opposite directions transversely of the axis of the bore, a core pin slidable through the bore into the cavity, said core pin being formed with the diametrically opposite segments formed as male images of segments of the female screw thread to be formed in the cavity, said segments on the core pin being separated by flutes deeper than the depth of the screw threads on the segments, the angle subtended by the segments on the core pin at the axis of the pin being less than the angle subtended by the flutes at said axis, two flat core members slidable transversely of the axis of said bore through said slots, said core members having their leading ends formed to fit snugly into respective flutes in the core member, means for moving the flat core members through the slots into and out of the mould cavity so that in their movement into the mould cavity their leading ends enter the respective flutes in the core member and engage the core member accurately between them and in their movement out of the mould cavity they move out of engagement with the core pin, and means for inserting, withdrawing and rotating the core pin through a predetermined angle.

3. Apparatus as claimed in claim 2, in which the slots for accommodating the core members are offset transversely from one another with respect to the axis of the core pin so that their median planes are parallel and on opposite sides of the axis of the core pin.

4. Apparatus as claimed in claim 2, in which the mould cavity is formed with said second bore opening into the cavity said bore being coaxial with the first-mentioned bore and a second core pin is slidable through said second bore.

5. Apparatus as claimed in claim 4, in which the two core pins are arranged to meet one another in the cavity.

6. Apparatus as claimed in claim 4, in which the second core pin is formed with segments of a screw thread diametrically opposite one another.

7. Apparatus as claimed in claim 6, in which the screw thread on the segments on the second core pin is different from the screw thread on the segments of the first core pin.

8. Apparatus as claimed in claim 4, in which the two core pins are arranged to be insertable in such a position that the flutes of the two pins line up with one another so that the leading end of each flat core member fits snugly into the respective aligned flutes on both pins.

* * * * *